(12) United States Patent
Morrison

(10) Patent No.: US 7,562,786 B2
(45) Date of Patent: Jul. 21, 2009

(54) OVERCAPS WITH FOLDABLE SCOOPS

(75) Inventor: Randall L. Morrison, Sylmar, CA (US)

(73) Assignee: Nestec S.A., Vevey (CH)

( * ) Notice: Subject to any disclaimer, the term of this patent is extended or adjusted under 35 U.S.C. 154(b) by 635 days.

(21) Appl. No.: 11/240,736

(22) Filed: Sep. 30, 2005

(65) Prior Publication Data

US 2007/0075555 A1   Apr. 5, 2007

(51) Int. Cl.
*B65D 41/56* (2006.01)
(52) U.S. Cl. .................. 220/212; 215/391; 220/379
(58) Field of Classification Search .......... 30/326; 220/212, 379; 215/391
See application file for complete search history.

(56) References Cited

U.S. PATENT DOCUMENTS

| 700,653 | A | 5/1902 | Jobson |
| 1,174,628 | A | 3/1916 | Sidway |
| 1,425,456 | A | 8/1922 | Dial |
| 1,625,335 | A | 4/1927 | Schneider |
| 1,703,185 | A | 2/1929 | White |
| 1,706,815 | A | 3/1929 | Phillipson |
| D123,940 | S | 12/1940 | Worth et al. |
| 2,485,303 | A | 10/1949 | Marcus |
| 2,547,991 | A | * 4/1951 | Witbrod ............ 206/301 |
| 2,921,707 | A | 1/1960 | Sloan |
| 3,755,895 | A | * 9/1973 | Claasen ............ 30/326 |
| 4,060,176 | A | 11/1977 | Tobiasson |
| 4,373,640 | A | 2/1983 | Resio |
| 5,197,623 | A | 3/1993 | Wang |
| 5,236,022 | A | 8/1993 | Husted |
| 5,251,774 | A | 10/1993 | Engle |
| 5,695,084 | A | 12/1997 | Chmela et al. |
| 5,706,974 | A | 1/1998 | Murdick et al. |
| 6,003,710 | A | 12/1999 | Huang |
| RE36,550 | E | * 2/2000 | West ............ 52/165 |
| 6,116,450 | A | 9/2000 | Huang |
| 2003/0201266 | A1* | 10/2003 | Steffan ............ 220/258.2 |

* cited by examiner

*Primary Examiner*—Anthony D Stashick
*Assistant Examiner*—Elizabeth Volz
(74) *Attorney, Agent, or Firm*—K&L Gates LLP

(57) ABSTRACT

Dispensing systems for administering particulate materials are presented. In an embodiment, the present invention provides a dispensing system comprising an overcap having an attachment member attached to a portion of a surface of the overcap and a foldable scoop including a handle and a cup. The handle has at least one connector so constructed and arranged for releasably attaching the handle to the attachment member of the overcap. The foldable scoop can be releasably attached to the overcap in a variety of ways.

21 Claims, 5 Drawing Sheets

OVERCAPS WITH FOLDABLE SCOOPS

BACKGROUND

The present invention relates generally to dispensing systems. More specifically, the present invention relates to overcaps, scoops and systems having same.

Covered containers holding particulate, granular or powdered materials are commonly known. Examples of such containers include powdered infant formula and coffee. Typically these containers do not come with any individual piece of dispensing equipment. A user generally opens the container and uses a household item such as a cup or a spoon for administering the contents thereof.

Occasionally containers holding particulate or powder products will provide their own dispensing equipment such as a spoon or small cup. Unfortunately, the dispensing cup is found lying in and covered with the powder materials. While retrieving the cup, the user gets the powder on his or her hands. In certain circumstances, the dispensing cup may settle to the bottom of the container over time or during transportation. The user is then forced to dig through the powder or pour out the contents of the container to find the dispensing cup, which may result in contamination of the product. Moreover, when the user is done removing the desired quantity of powder, the cup is placed back into the container and the same problems arise again the next time the container is used.

Therefore, there is a need to provide an improved dispensing system for simply and efficiently administering particulate material from a container.

SUMMARY

The present invention relates to dispensing systems comprising overcaps and foldable scoops. The dispensing systems can be used to dispense suitable particulate and powder materials. In an embodiment, the present invention provides a dispensing system comprising an overcap having an attachment member attached to a portion of a surface of the overcap and a foldable scoop including a handle and a cup attached to the handle. The handle can have at least one connector so constructed and arranged for releasably attaching the handle to the attachment member.

In an embodiment, the cup includes a first side portion, a second side portion and at least one hinge. The first side portion is attached to the handle. The second side portion is connected to the first side portion by the hinge. The first side portion and second side portion can be folded along the hinge to an open position and a closed position.

In an embodiment, the handle includes a locking mechanism and the second side portion includes an extension member so constructed and arranged to be releasably attached to the locking mechanism when the cup is in the closed position.

In an embodiment, the handle includes a protrusion and the extension member defines a hole therethrough so constructed and arranged to matingly receive the protrusion when the cup is in the closed position.

In an embodiment, the extension member includes a raised member.

In an embodiment, the second side portion includes a fastener mechanism so constructed and arranged to be releasably attached to an attachment section of the first side portion.

In an embodiment, the first side portion includes a first overlap member attached along an edge of the first side portion and the second side portion includes a second overlap member attached along an edge of the second side portion. The first overlap member extends over an edge of the second side portion, and the second overlap member extends over an edge of the first side portion when the cup is in the closed position.

In an embodiment, the hinge defines a hole therethrough so constructed and arranged for releasably attaching the hinge to the attachment member when the cup is in the open position.

In an embodiment, the first side portion defines a first gap and the second side portion defines a second gap such that the first and second gaps form a hole when the cup is in the closed position.

In an embodiment, the attachment member comprises a peg that is tapered, wherein the peg includes a detent so constructed and arranged for releasably securing the foldable scoop to the overcap in the open position and the closed position.

In an embodiment, a portion of the handle includes an I-beam structure.

In an embodiment, the dispensing system further comprises instructions printed on a portion of the surface of the overcap, wherein the instructions describe how to use the foldable scoop.

In another embodiment, the present invention provides a foldable scoop comprising a handle and a cup including a first side portion, a second side portion and at least one hinge. The first side portion is attached to the handle, and the second side portion is connected to the first side portion by the hinge. The first side portion and second side portion can be folded along the hinge to an open position and a closed position.

In an embodiment, the handle includes a peg and the extension member defines a hole therethrough so constructed and arranged to matingly receive the peg when the cup is in the closed position.

In another embodiment, the present invention provides a dispensing system for administrating particulate material. For example, the system comprises a lid including a substantially planar surface, a rim circumferentially surrounding the planar surface and a peg extending from a portion of the planar surface; and a foldable scoop including a handle and a cup. The cup can have a first side portion, a second side portion and at least one hinge. The first side portion is attached to the handle, and the second side portion is connected to the first side portion by the hinge. The first side portion and second side portion can be folded along the hinge to an open position and a closed position. The hinge can define a hole therethrough so constructed and arranged for releasably attaching the hinge to the peg when the cup is in the open position.

In an embodiment, the handle has at least one loop so constructed and arranged for matingly receiving the peg.

In an embodiment, the handle includes a gripping mechanism and the second side portion includes an extension member so constructed and arranged to be releasably attached to the gripping mechanism when the cup is in the closed position.

In an embodiment, the peg is tapered and the peg includes a detent so constructed and arranged for releasably securing the foldable scoop to the lid in the open position and the closed position.

In an embodiment, the particulate material comprises powdered infant formula.

An advantage of the present invention is to provide a dispensing system that is convenient and easy to use.

Another advantage of the present invention is to provide an overcap for a container and a foldable scoop readily attachable to the overcap.

Yet another advantage of the present invention is to provide a dispensing system for a container holding particulates or powders whereby users can easily find and retrieve the foldable scoop without contaminating their hands with the particulates.

Still another advantage of the present invention is to provide a dispensing system for particulate material that prevents or minimizes potential contamination of the material by the user.

Additional features and advantages are described herein, and will be apparent from, the following Detailed Description and the figures.

DETAILED DESCRIPTION

The present invention relates to dispensing systems. More specifically, the present invention relates to overcaps and foldable scoops for dispensing, administering or proportioning suitable particulate, granular and powder materials from containers container same. The powder materials can be any of a variety of dispensable materials, for example, baby formula, powdered beverages, flour, coffee, sugar, etc. It should be appreciated that the present invention can be adapted for dispensing or administering liquids or viscous materials as well. As used herein, overcap means a lid or other cover that is designed to removably close a container, for example, such as a jar. The overcaps, covers or lids can be in any suitable form to fit the containers for which they are designated or designed for.

Figure 1:
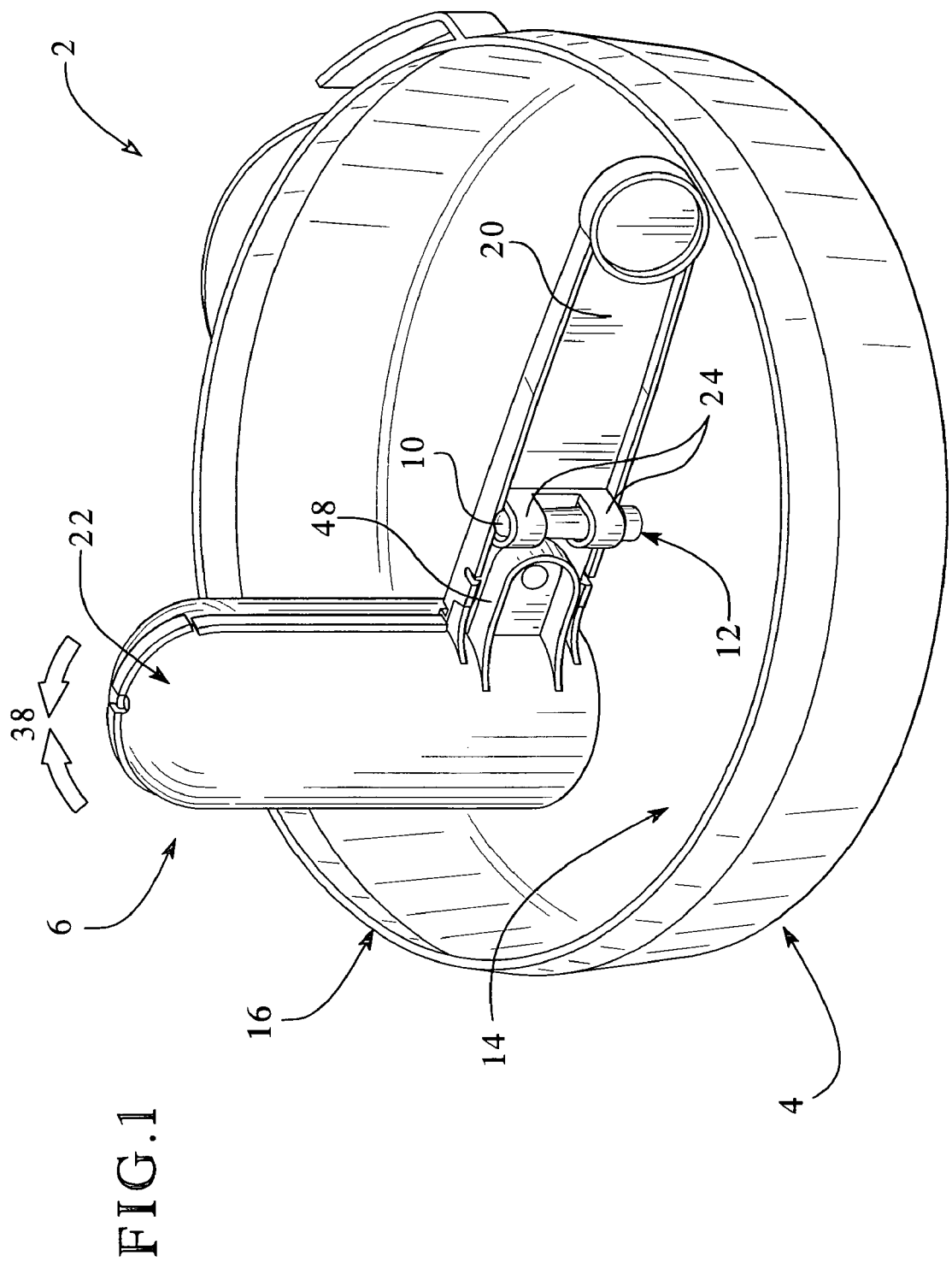
FIG. 1 is a perspective view of an embodiment of the dispensing system of the present invention illustrating the overcap and the foldable scoop in a closed position releasably attached to the overcap.

In an embodiment illustrated in FIG. 1, the present invention provides a dispensing system 2 comprising an overcap 4 and a foldable scoop 6. The overcap 4 has an attachment member 10 attached to a portion 12 of a surface 14 of the overcap 4. The overcap 4 can also include a substantially planar surface 14 and a rim 16 circumferentially surrounding the surface 14. The attachment member 10 can be, for example, a peg or protrusion. The foldable scoop 6 includes a handle 20 and a cup 22 attached to the handle 20. The handle 20 has one or more connectors 24 so constructed and arranged for releasably attaching the handle 20 to the attachment member 10. The connectors 24 can be, for example, loops or any suitable device capable of releasably attaching the handle 20 to the attachment member 10.

Figure 2:
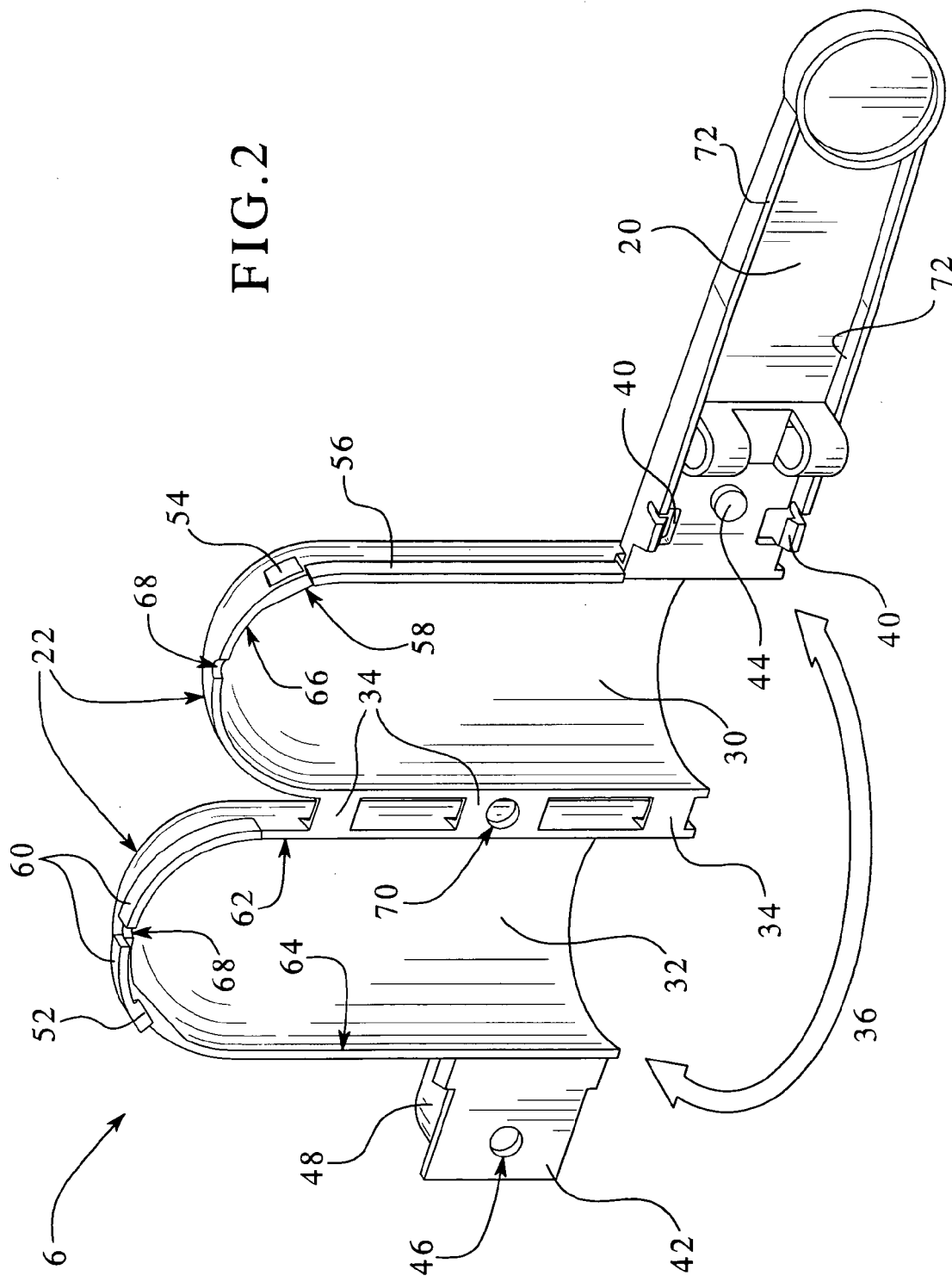
FIG. 2 is a perspective view of another embodiment of the foldable scoop of the present invention in an open position.
Figure 3:
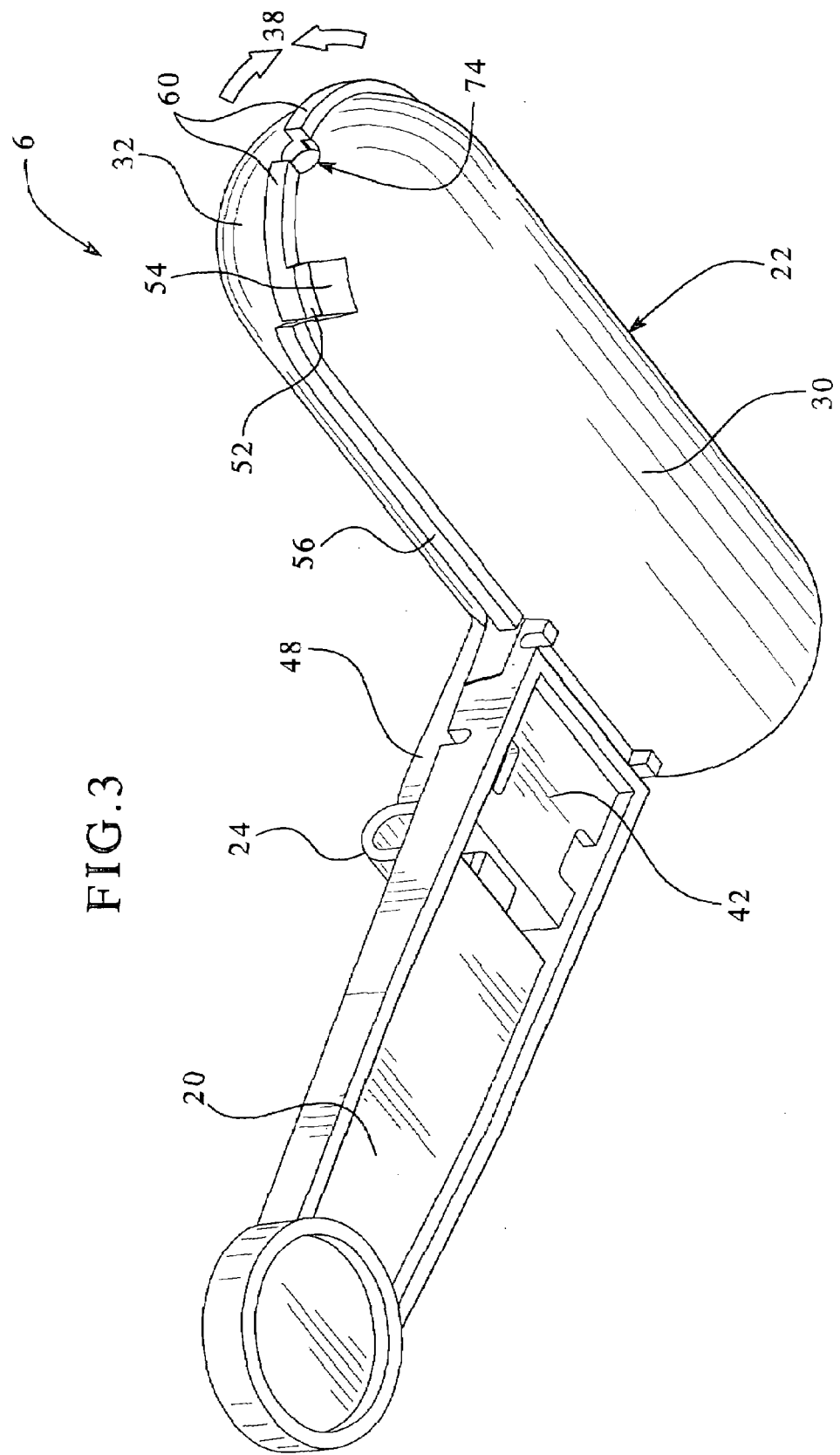
FIG. 3 is a perspective view of an alternative embodiment of the foldable scoop of the present invention in a closed position.

In another embodiment illustrated in FIGS. 2-3, the foldable scoop 6 comprises a cup 22 that includes a first side portion 30, a second side portion 32 and one or more hinges 34. The first side portion 30 is attached to the handle 20. The second side portion 32 is connected to the first side portion 30 by the hinges 34. The first side portion 30 and second side portion 32 of the cup 22 can be folded along the hinges 34 to an open position 36 illustrated in FIG. 2 and a closed position 38 illustrated in FIGS. 1 and 3.

In an embodiment, the handle 20 includes one or more gripping, latch or locking mechanisms 40 and the second side portion 32 includes an extension member 42 so constructed and arranged to be releasably attached to the locking mechanism 40 when the cup 22 is in the closed position 38.

Figure 4:
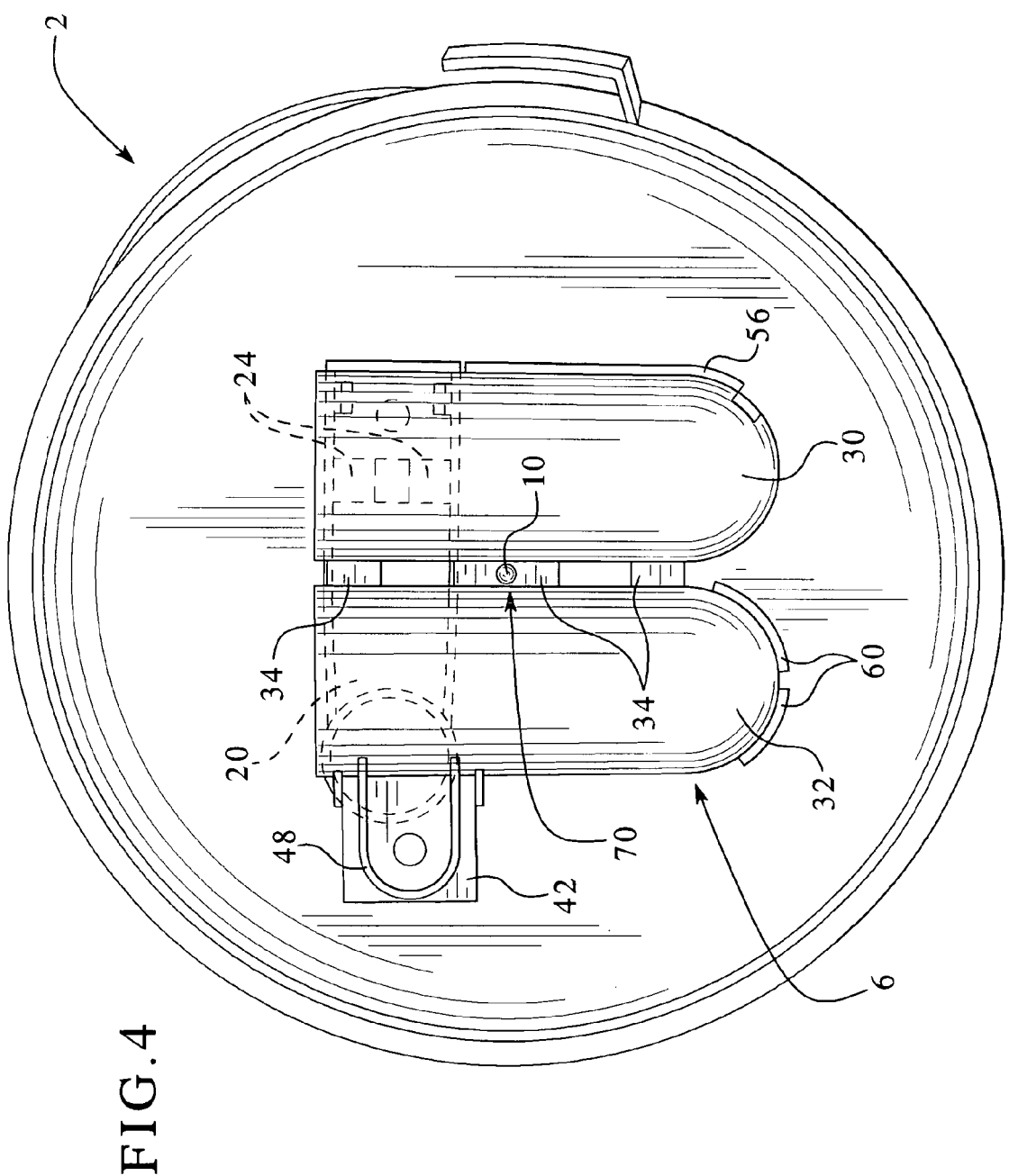
FIG. 4 is a top view of an embodiment of the dispensing system of the present invention illustrating the overcap and the foldable scoop in the open position releasably attached to the overcap.

In another embodiment, one or more of the hinges 34 defines a hole 70 therethrough. The hole 70 is so constructed and arranged for releasably attaching the hinge 34 to the attachment member 10 when the cup 22 is in the open position 36. The hole 70 can be on any one of the hinges 34 or on each hinge 34. The hole 70 can be any suitable size or shape capable of releasably attaching the hinge 34 to the attachment member 10 as shown in FIG. 4. Further, the handle 20 can be folded, for example, along its attachment to the cup 22 so as to fit between the cup 22 and the overcap 4 as shown in FIG. 4.

The foldable scoop 6 in the closed position 38 can be attached to the overcap 4 via the handle as illustrated in FIG. 1. In addition, the foldable scoop 6 in the open position 36 can be attached to the overcap 4 via the hinges as illustrated in FIG. 4.

In practice, the foldable scoop 6 can be attached to the overcap 4 in the open position 36 during the original manufacture of the container with the dispensing system 2. For example, typically containers of particulates or powders have a plastic, paper or foil material sealing the top of the container to prevent migration of moisture into the container. The foldable scoop 6 in the open position 36 takes up minimal space and can easily fit between the overcap 4 and the top of the container that is covered by a seal without interfering, tearing or protruding into the seal. After the overcap 4 is taken off the container and the seal is broken and removed, the foldable scoop 6 can be conveniently attached to the overcap 4 and stored in the closed position 38 as illustrated in FIG. 1.

In an alternative embodiment, the handle 20 includes a protrusion 44 and the extension member 42 defines a hole 46 therethrough. The protrusion 44 can be for example, a peg. The hole 46 is so constructed and arranged to matingly receive the protrusion 44 when the cup 22 is in the closed position 38.

In another embodiment, the extension member 42 includes a raised member 48. The raised member 48 provides a number of different functions. For example, the raised member 48 provides increased structural support for the extension member 42. Further, the raised member 48 should preferably be at a sufficient height from the extension member 42 above the connectors 24 so as to easily enable a user to snap or lock the extension member 42 in place with the locking mechanism 40. For instance, a user can insert the extension member 42 between the locking mechanisms 40 without interference from the connectors 24 by pushing the raised member 48. The raised member 48 can be, for example, U-shaped or any suitable shape that provides, the functions described above.

In an alternative embodiment, the second side portion 32 includes a fastener mechanism 52 so constructed and arranged to be releasably attached to an attachment section 54 of the first side portion 30 as illustrated in FIGS. 2-3. The fastener mechanism 52 is designed to snap or lock onto the attachment section 54 and be easily removed or unlocked when necessary. In practice, when the fastener mechanism 52 is attached to the attachment section 54, this provides additional support to maintain the cup 22 in the closed position 38 while being used.

In an embodiment, the first side portion 30 of the cup 22 includes a first overlap member 56 attached along an edge 58 of the first side portion 30. The second side portion 32 includes a second overlap member 60 attached along an edge 62 of the second side portion 32. The first and second overlap members 56 and 60 are capable of preventing the contents of the cup 22 from leaking or seeping through the cup 22 when the cup 22 is used in the closed position 38. For example, the first overlap member 56 extends over an edge 64 of the second side portion 32 and the second overlap member 60 extends over an edge 66 of the first side portion 30 when the cup 22 is in the closed position 38.

The first overlap member 56 and second overlap member 60 can also provide additional functions. For example, the overlap members 56 and 60 provide functional alignment for when the cup 22 is in the closed position 38. This prevents gaps that could allow materials to leak or seep through the cup 22 from forming between the edges of the first and second side portions 30 and 32. In addition, the overlap members 56 and 60 can provide an aesthetic function giving the foldable scoop 6 a more pleasing visual appeal.

In another embodiment, the edge 62 of the second side portion 32 and the edge 66 of the first side portion 30 can define gaps 68. These gaps 68 can form a hole 74 when the cup 22 is in the closed position 38 as illustrated in FIG. 3.

In an embodiment, a portion 72 of the handle 20 is in the shape of an I-beam structure. The I-beam structure of the handle 20 provides increased structural support. It should be appreciated that the handle 20 can be any suitable length, thickness and shape.

Figure 5:
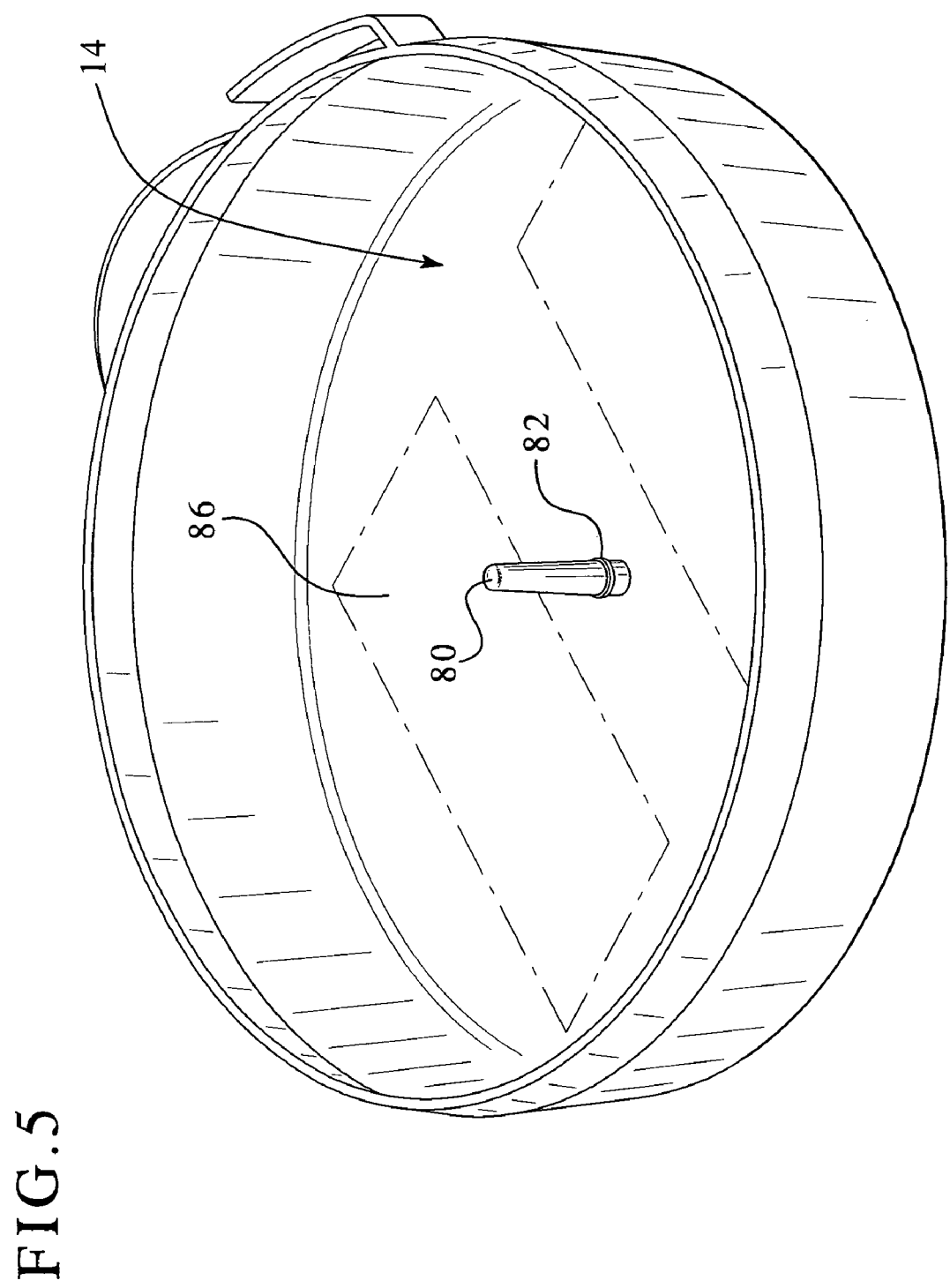
FIG. 5 is a perspective view of an embodiment of the overcap of the present invention.

In an alternative embodiment illustrated in FIG. 5, the attachment member 10 of the overcap 4 comprises a peg 80 that is tapered. The peg 80 can be located in any suitable position on the surface 14 of the overcap 4. Preferably, the peg 80 is located in the center of the overcap 14. The peg 80 may include a notch or detent 82 so constructed and arranged for releasably securing the foldable scoop 6 to the overcap 4 in the open position 36 and the closed position 38. For example, the detent 82 can provide a more secure and stable fit for the peg 80 when the peg 80 is inserted into the connectors 24 on the handle 20 or the hinge 34 having the hole 70. This prevents the foldable scoop 6 from easily sliding off the peg 72 when the lid or overcap 4 is turned over or placed onto a container.

In an embodiment, the overcap 4 comprises instructions 86 printed on the surface 14 of the overcap 4. The instructions 86 can depict or describe, for example, how to use the foldable scoop. The overcap 4 can also comprise any other suitable set of instructions.

In another embodiment, the present invention provides a foldable scoop 6 for dispensing systems. The foldable scoop 6 comprises a handle 20 and a cup 22. The cup includes a first side portion 30, a second side portion 32 and one or more hinges 34. The first side portion 30 is attached to the handle 22. The second side portion 32 is connected to the first side portion 30 by the hinges 34. The first side portion 30 and second side portion 32 can be folded along the hinges 34 to an open position 36 and a closed position 38. The foldable scoop 6 can contain features similar to those of the scoop 6 described above.

The overcap 4 and foldable scoop 6 can be any suitable size or thickness depending on the container volume and material to be dispensed. The overcap 4 and foldable scoop 6 can be made from any suitable materials such as plastics or other synthetic materials. For example, the overcap 4 can be made from a polyethylene material such as linear low density polyethylene. The foldable scoop can also be made from a suitable polypropylene.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A dispensing system comprising:
an overcap having an attachment member attached to a portion of a surface of the overcap; and
a foldable scoop including:
a handle having at least one connector so constructed and arranged for releasably attaching the handle to the attachment member; and
a cup attached to the handle, the cup including a first side portion, a second side portion and at least one hinge, the first side portion attached to the handle, the second side portion connected to the first side portion by the hinge, wherein the first side portion and second side portion can be folded along the hinge to an open position and a closed position, and wherein the hinge defines a hole therethrough so constructed and arranged for releasably attaching the hinge to the attachment member when the cup is in the open position.

2. The dispensing system of claim 1, wherein the handle includes a locking mechanism and the second side portion includes an extension member so constructed and arranged to be releasably attached to the locking mechanism when the cup is in the closed position.

3. The dispensing system of claim 2, wherein the handle includes a protrusion and the extension member defines a hole therethrough so constructed and arranged to matingly receive the protrusion when the cup is in the closed position.

4. The dispensing system of claim 2, wherein the extension member includes a raised member.

5. The dispensing system of claim 1, wherein the second side portion includes a fastener mechanism so constructed and arranged to be releasably attached to an attachment section of the first side portion.

6. The dispensing system of claim 1, wherein the first side portion includes a first overlap member attached along an edge of the first side portion and the second side portion includes a second overlap member attached along an edge of the second side portion, the first overlap member extending over an edge of the second side portion and the second overlap member extending over an edge of the first side portion when the cup is in the closed position.

7. The dispensing system of claim 1, wherein the first side portion defines a first gap and the second side portion defines a second gap such that the first and second gaps form a hole when the cup is in the closed position.

8. The dispensing system of claim 1, wherein the attachment member comprises a peg that is tapered, wherein the peg includes a detent so constructed and arranged for releasably securing the foldable scoop to the overcap in the open position and the closed position.

9. The dispensing system of claim 1, wherein a portion of the handle includes an I-beam structure.

10. The dispensing system of claim 1 further comprising instructions printed on a portion of the surface of the overcap, wherein the instructions describe how to use the foldable scoop.

11. A dispensing system for administrating particulate material, the system comprising:

a lid including a substantially planar surface, a rim circumferentially surrounding the planar surface and a peg extending from a portion of the planar surface; and a foldable scoop including:

a handle having at least one loop so constructed and arranged for matingly receiving the peg; and a cup having a first side portion, a second side portion and at least one hinge, the first side portion attached to the handle, the second side portion connected to the first side portion by the hinge, wherein the first side portion and second side portion can be folded along the hinge to an open position and a closed position and wherein the hinge defines a hole therethrough so constructed and arranged for releasably attaching the hinge to the peg when the cup is in the open position.

12. The dispensing system of claim 11, wherein the handle includes a gripping mechanism and the second side portion includes an extension member so constructed and arranged to be releasably attached to the gripping mechanism when the cup is in the closed position.

13. The dispensing system of claim 12, wherein the handle includes a protrusion and the extension member defines a hole therethrough so constructed and arranged to matingly receive the protrusion when the cup is in the closed position.

14. The dispensing system of claim 12, wherein the extension member includes a raised member.

15. The dispensing system of claim 11, wherein the second side portion includes a fastener mechanism so constructed and arranged to be releasably attached to an attachment section of the first side portion.

16. The dispensing system of claim 11, wherein the first side portion includes a first overlap member attached along an edge of the first side portion and the second side portion includes a second overlap member attached along an edge of the second side portion, the first overlap member extending over an edge of the second side portion and the second overlap member extending over an edge of the first side portion when the cup is in the closed position.

17. The dispensing system of claim 11, wherein the handle has at least one loop so constructed and arranged for matingly receiving the peg.

18. The dispensing system of claim 11, wherein the peg is tapered and wherein the peg includes a detent so constructed and arranged for releasably securing the foldable scoop to the lid in the open position and the closed position.

19. The dispensing system of claim 11, wherein a portion of the handle includes an I-beam structure.

20. The dispensing system of claim 11 further comprising instructions printed on a portion of the surface of the lid, wherein the instructions describe how to use the foldable scoop.

21. The dispensing system of claim 11, wherein the particulate material comprises powdered infant formula.

* * * * *